Feb. 10, 1953  C. LINDAHL  2,627,919
TIME-DELAY CONTROL APPARATUS
Filed Oct. 5, 1946  2 SHEETS—SHEET 1
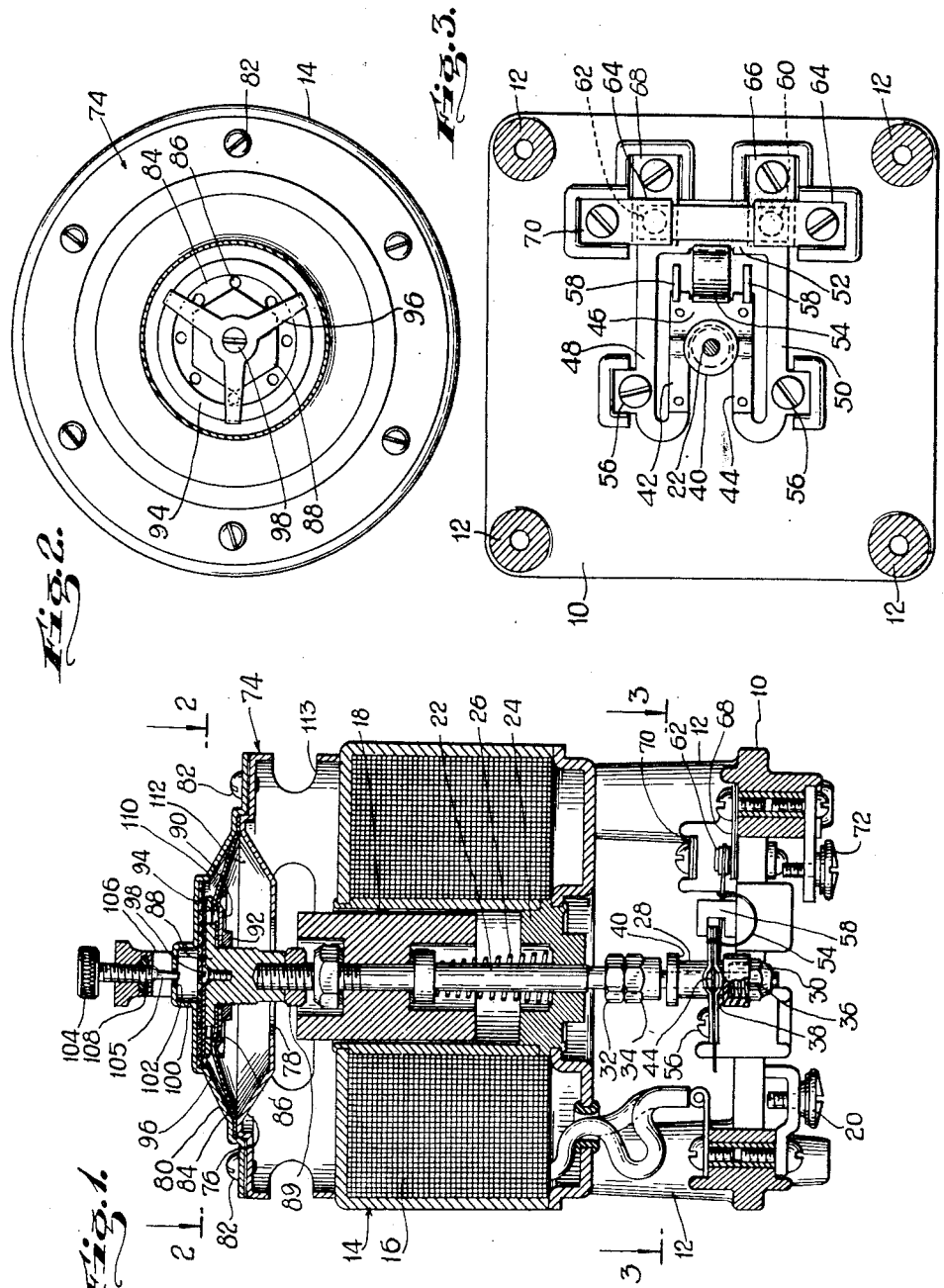
INVENTOR
Carl Lindahl
BY
his ATTORNEY Feb. 10, 1953 — C. LINDAHL — 2,627,919
TIME-DELAY CONTROL APPARATUS
Filed Oct. 5, 1946 — 2 SHEETS—SHEET 2
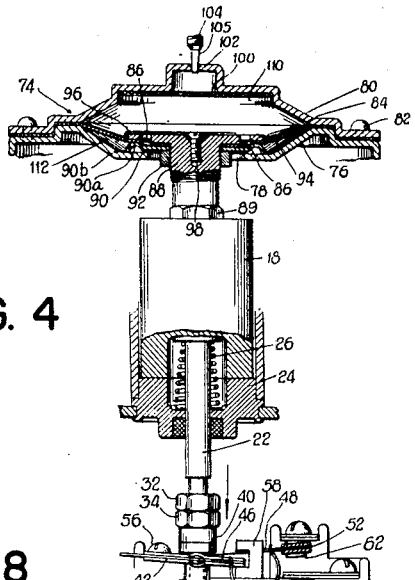
FIG. 4
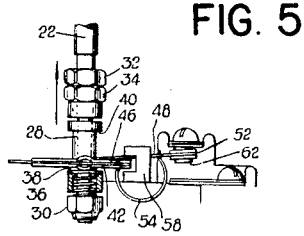
FIG. 5
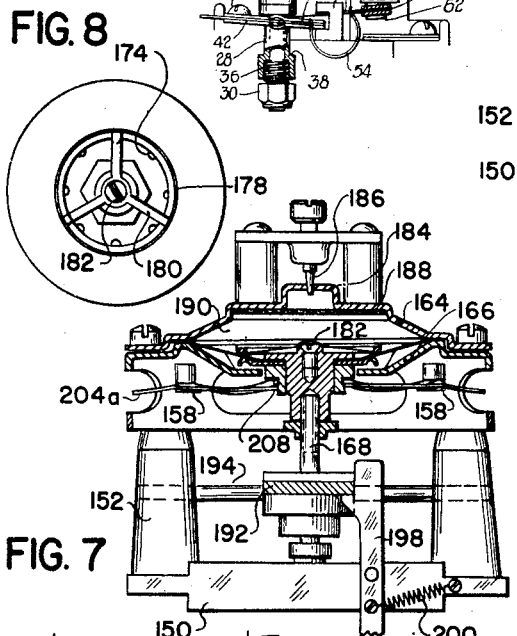
FIG. 8
FIG. 7
FIG. 10
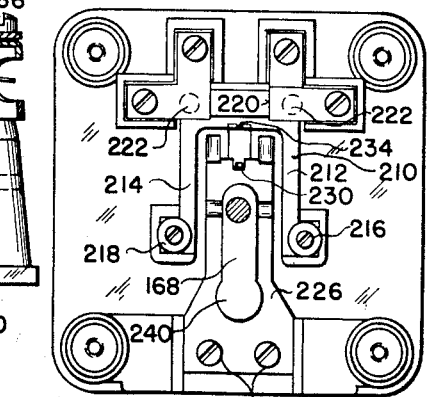
FIG. 6
FIG. 11
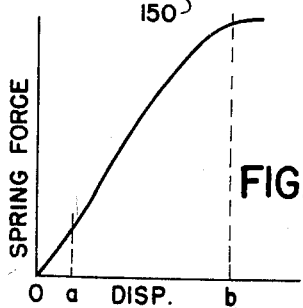
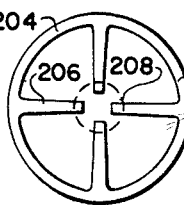
FIG. 9
INVENTOR.
Carl Lindahl
BY
his ATTORNEY Patented Feb. 10, 1953

2,627,919

UNITED STATES PATENT OFFICE 2,627,919

TIME-DELAY CONTROL APPARATUS

Carl Lindahl, Union, N. J., assignor to Elastic Stop Nut Corporation of America, a corporation of New Jersey Application October 5, 1946, Serial No. 701,515

24 Claims. (Cl. 161—1)

This application is a continuation-in-part with respect to my copending application Serial No. 535,365, filed May 12, 1944 (now Patent No. 2,489,381, granted November 29, 1949), and as to subject matter common to said application Serial No. 535,365 constitutes a division thereof.

The present invention relates to time delay apparatus and has particular reference to electro-pneumatic apparatus of the kind in which some desired event such as the closing or opening of an electric circuit is accomplished after the lapse of a predetermined and preferably adjustable time interval following the actuation of the apparatus by an operator or some automatic control.

The general object of the invention is the provision of novel apparatus of the character under consideration which will be simpler in construction and cheaper to manufacture than devices of a similar character heretofore available; which will have novel operating characteristics advantageous for devices of this kind, particularly with respect to the nature and magnitude of the forces developed in different operative positions of the device; and which will be reliable in operation under various operating conditions including those in which the device is subjected to vibration.

For a better understanding of the more detailed nature of the invention and the manner in which the above noted as well as the more specific objects of the invention are attained, reference may best be had to the ensuing portion of this specification, taken in conjunction with the accompanying drawings, disclosing by way of example but without limitation suitable examples of apparatus embodying the principles of the invention.

In the accompanying drawings:

Fig. 1 is a longitudinal section through an apparatus, embodying the invention;

Fig. 2 is a section on line 2—2 of Fig. 1;

Fig. 3 is a section on line 3—3 of Fig. 1;

Fig. 4 is a fragmentary view on larger scale of parts of the structure of Fig. 1 in different operative position;

Fig. 5 is a fragmentary view of parts of the structure of Fig. 1 in still another position;

Fig. 6 is a view similar to Fig. 1 of a different form of apparatus embodying the invention and adapted to be activated or armed mechanically;

Fig. 7 is a view of the device shown in Fig. 6 taken at right angles to Fig. 6, and in a different operative position;

Fig. 8 is a plan view of a part of the apparatus illustrated in Fig. 6;

Fig. 9 is a plan view of a spring element forming a part of the device of Fig. 6;

Fig. 10 is a graph illustrative of the operative characteristic of the spring shown in Fig. 9 as employed in the device of Fig. 6; and Fig. 11 is a top plan view of the switch employed in the device of Fig. 6.

Referring now to the drawings, the apparatus shown in Fig. 1 and related figures comprises a base 10, which may advantageously be molded from suitable insulating compound, provided with legs 12 on which a solenoid 14 is mounted. The solenoid comprises the usual coil 16 and armature 18, the terminals for the coil being carried by the base, one such terminal being shown at 20. Since in so far as the present invention is concerned, the specific type or construction of the solenoid is not critical, any suitable construction of known kind may be employed to accommodate the kind and voltage of current available for its energization.

A motion transmitting member is secured to the armature 18 for reciprocatory motion therewith, this member including a rod 22 passing through a guide bore in a stop member 24 carried by the solenoid casing and providing a stop for limiting movement of the armature and rod in the direction taken when the solenoid is energized. A spring 26 between the stop 24 and a collar on rod 22 acts to force the armature out of the coil to the position shown in Fig. 1 when the coil is deenergized.

The lower end of rod 22 is of reduced diameter and has slidably mounted thereon a lost motion element in the form of a sleeve 28, the travel of which relative to the rod is limited on the one hand by the nut 30 and on the other by the adjustable locknuts 32 and 34 threaded on rod 22. The lower end of sleeve 28 is recessed to receive a spring 36 which acts to bias the sleeve away from nut 30 and against the locknut 34. The outer surface of the sleeve is channeled to provide end shoulders or abutments 38 and 40.

The sleeve 28 passes between the inner arms 42 and 44 of a spring loaded toggle or over center switch, these arms being connected at their free ends by a notched bar 46. At their opposite ends the inner arms are reversely turned outwardly to form outer arms 48 and 50, respectively, these latter arms being bridged at their free ends by the notched bar 52. The notches in bars 46 and 52 confront each other and receive the ends of a compressed U-shaped spring 54 which provides the spring load for the switch. The arms of the switch are of spring metal and the switch is attached to the base by screws 56 engaging the outer arms near the ends where they join the inner arms. The travel of the bar 46 at the free ends of the inner arms is limited by stops 58 on the base 10. The bar 52 connecting the outer arms 48 and 50 carries contacts 60 and 62, the former arranged to travel between contact strips 64 and 66, and the latter arranged to travel between the contact strips 68 and 70. The several contact strips are connected to suitable binding posts on the bottom of the base, one of which appears at 72 in Fig. 1.

Mounted above the solenoid casing is a diaphragm casing indicated generally at 74, this casing comprising a lower dished plate 76 having a central aperture 78 and an upper and oppositely dished cover plate 80 detachedly secured to the lower plate by suitable screws 82. A flexible diaphragm 84 is clamped at its periphery between the lower and upper plates 76 and 80. This diaphragm is preferably of very light and flexible material such as cloth, suitably impregnated with varnish, resin or the like to render it impervious to the passage of air and is provided with a plurality of perforations 86 near its center. The central part of the diaphragm inside of the circle of perforations is clamped between a member 88 threaded on to the upper end of rod 22 and locked in position by a locknut 89 and an annular disc 90 the rim of which is crimped upwardly to semicircular form as indicated at 90a. Advantageously but not necessarily a small notch 90b may be provided in the edge of the rim which, as will be seen from Figure 4, bears against the lower diaphragm plate 76 in one position of the apparatus. The disc 90 is held in clamping position against the diaphragm by means of a retaining ring 92 threaded over the member 88. Above the diaphragm an annular valve ring 94 is yieldably held in centered position by means of a retaining spring 96 having a series of radially extending arms, in the present instance three, the ends of which are turned downwardly to provide fingers engaging the outer periphery of the valve ring 94. Spring 96 is held in position by means of a screw 98 threaded into the top of the member 88. As will be seen more clearly from Fig. 2, the diameter of the valve ring is such that it bears against the diaphragm on a circle lying outside perforations 86 and from Fig. 4 it will be seen that the valve ring diameter is also such that it overlies the rim 90a of the disc 90.

The central portion of the upper plate 80 is recessed to provide for the reception of a filter 100 of any suitable material such as felt or the like which is glued or otherwise secured to the plate. Plate 80 is provided with an additional recess above the filter, this recess having a central aperture or port 102, the free area of which is governed by an adjusting screw 104 having a tapered pilot portion 105 extending into the port. The screw 104 is held by a suitable bridge member 106 through which it is threaded and the bridge member may advantageously be provided with an insert 108 of elastic material through which the screw 104 is threaded and in the bore of which the screw impresses a thread. The material of the insert may be of vulcanized fibre or the like, which provides a gripping action for holding the screw against turning so as to eliminate movement thereof from desired adjusted position. Obviously other means for locking the screw in adjusted position may be employed.

The type of apparatus just described is designed to effect the desired time delay operation commencing with the instant when the solenoid is deenergized after having been energized to activate or arm the apparatus. The apparatus is shown in its normal non-operating position in Fig. 1. In this position the motion transmitting member comprising the rod 22 and its associated parts is at the top of its travel due to the action of spring 26, the diaphragm chamber 110 formed between the upper plate 80 and the diaphragm 84 being of minimum volume and the sleeve 28 at the lower end of the motion transmitting member being held in its lower position relative to the rod 22 by the contact between the switch arms 42 and 44 and the shoulder 38 at the lower end of the sleeve. These switch arms force the sleeve to its lowest position in which the spring 36 is compressed, because of the limit to the upward movement of the switch arms by the stops 58 on the base. Obviously the spring 26 is stronger than the spring 36 and capable of moving the assembly to the position shown in which spring 36 is compressed. If the solenoid circuit is now closed to activate or arm the apparatus, the armature 18 is pulled downwardly until it meets the stop 24, against the force of the spring 26 which is compressed by this movement. When the armature and motion transmitting member is thus pulled to its lower or armed position, spring 36 is first permitted to expand to move the sleeve 28 relative to rod 22 until the sleeve reaches its upper position in contact with the adjusting nut 34. As the downward movement continues the shoulder 38 moves away from the switch arms 42 and 44, and further movement of the motion transmitting member brings the shoulder 40 at the upper end of the sleeve into contact with arms 42 and 44. Continued downward movement causes the arms 42 and 44 to be depressed from the position shown in Fig. 1, against the resistance of the spring 54 until the dead center position of the toggle switch is passed, whereupon the switch acts to reverse the position of the contacts 60 and 62 from that shown in Fig. 1 to the position shown in Fig. 4. At the termination of the downward movement the inner switch arms 42 and 44 are in contact with the stops 58 as shown in Fig. 4.

The downward movement of the armature and motion transmitting member effected by energizing the solenoid operates also to move the diaphragm 84 from the position shown in Fig. 1 to the position shown in Fig. 4. This is accomplished without material resistance or the creation of an appreciable vacuum in the chamber 110, the action being as follows:

The space 112 between the diaphragm and the lower plate 76 is in substantially open communication with the atmosphere by way of the openings 113 in the casing and the annular space provided by the opening 78 in the lower plate 76. Consequently so far as any air in the space 112 is concerned, the diaphragm is free to move downwardly without resistance. Also, as the volume of the chamber 110 is enlarged, air is permitted to flow from space 112 into this chamber past the check valve formed by the valve ring 94 since the arms of the retaining spring 96 are extremely light and flexible and permit a very slight depression in pressure in the chamber 110 to cause the valve ring to lift so that air can flow between the lower side of the diaphragm and the rim 90a thence to chamber 110 through the openings 86 in the diaphragm. In this connection it is important to note that the valve associated with the diaphragm is constructed so as to permit the flow therethrough upon such a slight differential pressure that substantially no flow of air into chamber 110 takes place through the metering orifice formed by the port 102 and pin 105, since there is a certain amount of resistance to rapid flow of air through the filter 100.

After the apparatus is moved to its armed position by energizing the solenoid, as shown in Fig. 4, the time delay action is then commenced whenever the solenoid is deenergized. When this is done the spring 26 commences to push the armature and motion transmitting member upwardly, the rapidity of the movement being determined by the size of the metering orifice at the port 102, which controls the rate at which the air can flow from the diaphragm chamber. Upon upward movement of the assembly it will be apparent that the valve ring 94 and the rim 90a of disc 90 will form a check valve preventing back flow of air through the openings 86 in the diaphragm.

As the assembly moves upwardly under the influence of spring 26 the shoulder 40 on sleeve 28 moves away from the switch arms and the sleeve remains in its upper position relative to the rod 22 under the influence of spring 36. At an intermediate point in the travel of the assembly the switch arms are brought into contact with the lower shoulder 38 on sleeve 28 and the sleeve 28 is then moved downwardly relative to the rod 22, compressing spring 36 as seen in Fig. 5. When the switch arms first come into contact with the shoulder 38 the resistance to movement of the switch provided by spring 54 is sufficient to initially compress spring 36, but as the movement continues and spring 36 is further compressed the resistance provided by this spring finally reaches a value sufficient to overcome the resistance of spring 54 with the result that the switch is suddenly snapped over its dead center position from the position shown in Figures 4 and 5 to the position shown in Figure 1. This is permitted because of the lost motion connection between the sleeve 28 and the rod 22.

This feature of the apparatus is important for the reason that it maintains a substantial pressure contact between the switch points or contacts at all times, a condition which would not obtain if this feature were absent. The reason for this latter may best be understood by a consideration of Fig. 5, letting it be assumed that the sleeve 28 is fixed on the rod 22. It will be apparent that the action of spring 26 working against the pressure in the diaphragm chamber from which air is permitted to escape at a constant rate through the metering orifice results in uniform speed of movement of the rod 22. Consequently, if the sleeve 28 were fixed on this rod 22 the switch arms 42 and 44 would be moved upwardly at uniform rate until dead center position was reached, that is, a position in which these arms would lie in the same plane as the outer switch arms 48 and 50. When in this position the spring 54 would exert force only in the common plane of the switch arms and there would be no component of force from this spring providing any contact pressure for the contacts at the ends of the switch arms.

In the position of the switch shown in Fig. 5, there is a substantial component of force from spring 54 providing contact pressure but if it is assumed that sleeve 28 is fixed relative to rod 22 this component of force from spring 54 should gradually diminish to zero value at the time when dead center position is reached after which the switch would snap over to its other position by virtue of the inner switch arms being moved past the dead center position. This would result in an appreciable period of time, particularly if the setting of the diaphragm chamber orifice were such as to give very slow motion to the rod 22, during which the switch contacts would not be firmly held together, with the resultant possibility of a premature break in the circuit controlled by the contacts or chattering of the contacts due to inertia if the apparatus were in service under conditions where it was subjected to vibration.

With the present construction the above difficulty is avoided since the compressed spring 36 overcomes the resistance of spring 54 before the dead center position is reached and while the latter spring is still positioned so as to exert a contact pressure on the contacts. From a consideration of Fig. 5, it will be seen that as the rod 22 continues to move upwardly from the position shown in the figure the spring 36 is in effect applying pressure to the switch contacts, the latter acting as a stop or abutment for determining the position of one end of spring 54 and the force from the compressed spring 36 acting on the opposite end of spring 54.

The spring 36 acts in the nature of a booster spring which in effect boosts the switch across its dead center position from a position ahead of that at which the switch would be caused to pass its dead center position in the absence of the lost motion connection and booster spring.

In order for the device to be and remain accurate in its timing over a considerable length of life, it is necessary for the diaphragm chamber orifice to remain constant in cross section. The inclusion of dust or other foreign matter in the orifice tends to destroy this accuracy and it has in the past been proposed to avoid this difficulty by using two diaphragm chambers between which a sealed body of air is transferred through a metering orifice so that the same body of air, which can be freed from impurities, is used over and over again. This construction is not only relatively expensive but has proved to be imperfect for apparatus to be used in aircraft where altitude and ambient air pressure may vary between wide limits. In the present device an extremely simple and inexpensive diaphragm chamber and valve construction is achieved and at the same time difficulty arising from a clogged or partially clogged metering orifice is eliminated, since the flow of air through the orifice is always in the one direction in which it is filtered before passing through the orifice. As previously explained, when the device is shifted from the position in Fig. 1 to the position in Fig. 4, the relatively slight resistance to air flow from the chamber 112 to the chamber 110 is substantially less than the resistance to flow to the chamber 110 through the metering orifice and the filter. The flow through the orifice is thus in effect entirely outward from the chamber through the filter to the ambient atmosphere.

In some instances it may be desirable to have the device mechanically activated or armed rather than to do this by electrical means and such form of construction is illustrated in Fig. 6. The embodiment of Fig. 6 also includes a novel and improved form of spring means for applying the actuating force during the time delay period as well as a novel and improved form of over center switch by means of which greater pressure contact may be maintained on the switch contact points without commensurate increase in the force required to throw the switch from one terminal position to the other. As the description proceeds it will become evident that these features may equally well be applied to an electrically energized device of the kind shown in Fig. 1 and related figures and that the novel spring and switch features may also be applied to other forms of apparatus where the same operating characteristics may be desired.

As shown in Figs. 6 and 7 the device comprises a base 150 carrying the switch which will later be described and being provided with supporting legs 152 to which is secured by any suitable means the timing head indicated generally at 154. This head provides a diaphragm casing comprising a lower part 156 having four equi-distantly spaced spring supports 158 struck inwardly therefrom and further being provided with four dished arms 160 projecting radially inwardly from the top of the member. These arms provide between them slots 162.

The upper portion of the diaphragm casing is formed by a dished plate 164 between which and the lower part 156 the diaphragm 166 is clamped. This diaphragm is connected to a motion transmitting member 168 by means of upper and lower clamping parts 170 and 172. The diaphragm is provided with a series of perforations 174 as seen in Fig. 8 and outside the circle of perforations the diaphragm is held between a lower supporting plate 176 having a circumferentially extending ridge at its periphery and a pressure ring 178 bearing on the upper face of the diaphragm opposite the rim of the lower supporting plate. As seen in Figs. 6 and 8 the ring 178 is of L-shaped cross section providing an upstanding rim and by means of a spider-like spring 180 this ring is pressed against the diaphragm and also centered by the spring, the radial arms of which fit inside the rim of the ring. Spring 180 is attached by means of screw 182 to the part 170. The construction of the timing head just described is similar to the embodiment shown in Fig. 1. The upper dished plate 164 is provided with a vent or orifice 184 the area of which is controlled by the adjustable threaded pin 186 which terminates in a tapered needle valve opening. A filter cloth or pad 188 is fixed in a suitable recess in the plate 164.

The timing chamber 190 is provided by the space between the diaphragm 166 and the upper plate 164 and in Fig. 6 the motion transmitting member is shown at the terminal position at the end of a timing period in which the timing chamber is of minimum volume. In Fig. 7 the apparatus is shown in its other terminal position in which the device is in its activated or armed position ready for the commencement of a timing period. The valve action for admitting air to the chamber and the egress of air therefrom during the working strokes are the same as previously described in connection with the embodiment of Fig. 1 and description thereof need not be repeated.

In the present embodiment the device is armed mechanically by means of lever 192 pivoted on the cross rod 194 carried by legs 152 and bearing against a collar 196 forming a part of the motion transmitting member 168.

For different types of time delay control different sequences of actuation may be desired. For example it may be desirable to arm the device and throw the over center switch to one position by movement of a predetermined part of another mechanism and later commence operation of the time delay period by action of some other member of the mechanism at a different time. In the example illustrated such action may readily be accomplished by providing a pivoted latch as shown at 198 biased by a spring 200 and adapted to engage the lever 192 to hold the device in its armed position until the latch is tripped. Obviously other expedients may readily be employed to adapt the device to any desired time cycle.

In the operation of this device it will be evident that when the device is moved to its armed position the switch will be thrown over center by the force applied to the arming lever 192 which may readily be of any desired magnitude. This force also operates to compress the spring which serves to actuate the device during the timing period. Referring back to Fig. 4 in which the actuating spring is of the usual coil form it will be evident that in common with usual spring action the spring is compressed when the device is armed by the solenoid and actuates the device during the timing period by expanding. As the spring expands from its compressed position to a less compressed or to a relaxed position the force exerted by the spring diminishes. In other words the spring has the common characteristic of what may be termed a decreasing force-displacement characteristic. On the other hand in a device of the kind illustrated an opposite characteristic may often be desirable, that is an increasing force-displacement characteristic as the spring moves towards its relaxed position. The reason for the desirability of this will be evidenced from the fact that it is when the motion transmitting member approaches the end of its stroke during the timing period that it is desired to throw the switch or exert mechanical force for performing such action as may be desired at the end of the timing period.

In order to secure this action I have provided a novel form of actuating spring which is capable of providing a force-displacement characteristic which is the exact opposite of that of the usual tension or compression spring and in which this characteristic, which is the reverse of normal, may be obtained solely by the nature and construction of the spring and its mounting and without resort to mechanical effect through a system of levers, cam action or the like.

One embodiment of such a spring is illustrated in Fig. 9 in which the spring, which is of flat sheet metal, is indicated generally at 202. The spring comprises an outer annular ring portion 204 provided with a plurality of inwardly radially projecting arms or fingers 206 which in the present instance are slightly tapered from their base portions where they join the outer ring to their inner tips. By reference to Figs. 6 and 7 it will be seen that the lower clamping member 172 is formed with an annular shoulder providing an abutment 208 adapted to act as a spring support. As will be seen from Fig. 9 the diameter of this support is somewhat larger than the diameter of the inscribed circle within the inner ends of the spring fingers 206.

As shown in Figs. 6 and 7 the spring 202 is mounted so that the outer ring portion 204 rests freely on the spaced supports 158 provided on the casing member 156. The radial arms 206 are bowed to engage the abutment 208, extending radially through the slots 162 in member 156, the arms 160 between these slots providing a protecting shield for the diaphragm 166. With the apparatus in the position shown in Fig. 6 the outer ring part 204 of the spring is substantially plane with the fingers bowed upwardly therefrom as shown. As the device is armed by moving the motion transmitting member 168 downwardly to the position shown in Fig. 7 the arms 200 are moved downwardly with their inner ends traveling in a straight line rather than on arcs about the respective base ends of the fingers. At the lower terminal position the inner ends of these fingers remain slightly above the plane of support of the spring as will be seen from Fig. 7. The movement to arming position, resulting in the movement of the tips of the spring fingers toward the general plane of the spring results in a warping distortion of the outer ring part 204 so that the segments of this portion between the points of support 158 flex downwardly from the general plane of the spring to positions indicated at 204a in Fig. 7. This flexure, which is in effect flexure in peripheral direction out of the plane of the spring, is also accompanied by warping flexure of the ring part of the spring along radial lines so that the ring portion of the spring when flexed to the position shown in Fig. 7 presents what may be termed a compound warped surface, being flexed out of its normal plane both peripherally and radially.

As a result of the nature of the flexure imposed on the several parts of the spring as it is moved from the position shown in Fig. 6 to the position in Fig. 7, the resistance of the spring to such movement progressively decreases, in contrast to the characteristic of the usual form of spring such as shown in Fig. 4 wherein when the spring is compressed by downward movement of the motion transmitting member to its lower position, the resistance of the spring progressively increases.

I have found that the novel force-displacement characteristic of the embodiment shown in Fig. 6 is not dependent upon supporting the spring at the places of juncture between the outer ring and the fingers, but it is important to the proper functioning of the spring to produce the desired force-displacement characteristic that the spring be freely supported, as by the supports 158, rather than clamped or otherwise rigidly held.

In Fig. 10 there is shown the nature of the force-displacement characteristic obtainable with a spring such as that above described, when installed in the device shown. In this diagram the displacement of the spring is represented by the abscissae and the axial force exerted by the spring by the ordinates. In the diagram the position of the spring in the terminal position shown in Fig. 7, which is determined by a stop limiting movement of the motion transmitting member 168, is indicated at $a$. The position of the spring in its other terminal position as shown in Fig. 6, which is determined by another stop acting on the motion transmitter, is indicated at $b$. As will be evident both of these positions are on one and the same side of the plane of the rim portion of the spring. If the appropriate stops on the motion transmitting member were positioned so that the inner ends of the spring fingers could move downwardly from the position shown in Fig. 7 to a position in which the ends of the spring were in the plane of the rim portion of the spring a dead center position, indicated at $o$ on the diagram, would be reached in which the spring would exert no axial force.

During the range of movement between positions $a$ and $b$ the force-displacement relationship is substantially a straight line function but as indicated by the curve of Fig. 10 this relationship ceases to hold after a certain displacement of the spring has taken place.

If the inner ends of the spring fingers are moved past the dead center position, as for example by moving the motion transmitting member downwardly so that the inner ends of the spring fingers are below the plane of the rim of the spring as seen in Fig. 7, the force-displacement relation again has a rising characteristic. In other words if the curve of Fig. 10 were projected to the left of the zero ordinate line the curve would again rise. If the spring were to be moved into the range in which the inner ends of the spring fingers were on the side of the plane of the rim opposite that shown in the terminal position of Fig. 7, it is evident that abutments for restraining movement of the rim portion of the spring away from the supporting abutments 158 would be required and in any device where for any reason it might be desired to have the spring act on both sides of the plane of the rim suitable supporting abutments would have to be provided on both sides of the rim portion. In such case, however, the abutments on the opposite sides of the spring should be spaced away from each other far enough to permit freedom of flexure of the portion of the spring retained between the abutments.

By way of example but without limitation the following results are given from experience with an actual constructional example of the device shown in Fig. 6 and related figures. With a spring made of beryllium-copper of .005 inch thickness, having a diameter of approximately 2¼ inches and with ring and finger portions approximately ⅛ inch wide, installed in a timing head in which the distance $a$—$b$ of Fig. 10 is approximately $\frac{3}{16}$ of an inch, the force exerted by the spring in its armed position at $a$ amounted to approximately 90 grams, while the force exerted by the spring in its position at $b$ amounted to approximately 240 grams.

While but one constructional example of the spring and mounting has been shown, it will be evident that the principles involved may be applied to different specific variations of spring design. Thus the number of spring fingers and points of support may be varied as well as the configuration of the rim portion of the spring which does not necessarily have to be an exact annulus of uniform radial width as shown in Fig. 9. Also the nature of the force-displacement characteristic of the spring may be varied by varying the relation of the relative strength of the ring or rim portion of the spring with respect to the fingers. This may be accomplished for example by making the rim portion of thicker metal than the fingers, in which case it will be found that the slope of the force-displacement curve is more nearly horizontal than indicated in Fig. 10.

Referring now to the switch construction illustrated in Fig. 11 the switch comprises a movable contact member indicated generally at 210. In the embodiment illustrated this member comprises two spaced arms 212 and 214 of elastic material fixed at one end by the studs 216 and 218 respectively, and having their free ends joined by a cross bar 220. This member carries upper and lower contacts 222 and 224 movable between suitable companion contacts secured to the base 150. It is not essential insofar as the action of the switch is concerned that the arms 212 and 214 be elastic since all that is required of the contact member is that it permit movement of the contacts to upper and lower positions between the fixed cooperating contacts. Thus for example arms 214 and 212 might be rigid and either hinged at the points of attachment to the base or loosely held by the studs 216 and 218 to permit the desired oscillating movement of the contact member. From a manufacturing and cost standpoint, however, it is more desirable to make these arms of elastic material such as suitable thin sheet metal. For reasons hereinafter explained the resistance to movement of the contact member to either one of its terminal positions, in case elastic arms are used, should be relatively very slight.

A leaf spring member 226 is fixed to the base at one end by means of studs 228, the free end of this member extending between the fixed end portion of the contact member 210. At its inner or free end the member 226 is notched as shown at 230 to receive one end of a compressed U-shaped actuating spring 232 the other end of which is held in the notch 234 in the part 220. The base 150 is provided with two vertically spaced projections forming abutments 236 and 238 between which the inner end of the spring 226 projects, these abutments serving to limit the travel of the inner end of this member.

The action of the switch in moving over center from one to another of its terminal positions is in principle the same as that previously described in connection with the embodiment shown in Fig. 1 and related figures but differs therefrom in one important respect. The leaf spring member 226 is secured to the base so that in its normal relaxed position its free inner end is located substantially midway between the spaced abutments 236 and 238. In Fig. 6 the switch is shown in the upper terminal position of the device in which the lower contacts 224 are in engagement, and the U-shaped spring 232 has forced the spring 226 into contact with the upper limiting abutment 236. The force with which the contacts are pressed into engagement is in this position of the apparatus dependent upon the strength of the U-spring 232 and the position of that spring, which is determinative of the resultant downward force applied to the contacts. At the same time, with the switch in the terminal position shown the spring member 226 is flexed and exerts downward force in the same direction as that required to be exerted by the motion transmitting member 168 to throw the switch over center to its other terminal position. So long, however, as the spring 226 has insufficient strength to force the U-spring away from its terminal position the downward force exerted by the spring 226 does not decrease the pressure exerted by the switch on the contacts. The force of spring 226 tending to throw the switch is, however, cumulative with the force exerted by the motion transmitting member to throw the switch. Consequently, less force is required from the latter member to throw the switch than would be the case if spring 226 were not exerting force in the same direction. As a result, a much stronger U-spring can be employed, resulting in much stronger pressure on the contacts, for a given required force to throw the switch over center, than would otherwise be the case. Obviously since the neutral position of spring 226 is between the positions assumed in either terminal position of the switch the same assisting action is performed by this spring in shifting the position of the switch from its second terminal position back to the position shown in Fig. 6. By reference to Fig. 6 it will be seen that if the arms 212 and 214 of the spring member 210 are rigidly fixed as in the embodiment shown and these arms were relatively stiff so as to exert material resistance against flexure they would tend to decrease the net contact pressure in the terminal positions of the switch since they would be acting in opposition to the force exerted in those positions by the spring 226. For this reason the resistance to movement of these arms from the center position is advantageously substantially zero as in the case of hinged arms or of negligible magnitude as in the case of arms fixed at their ends but having relatively very slight resistance to the flexure required to move the terminals to their contact positions.

The spring member 226 is provided with an aperture 240 through which the motion transmitting member 168 extends as shown in Figs. 6 and 11, acting on member 226 to throw the switch from one to the other of its terminal positions through engagement of suitable shoulders provided on the motion transmitting member. In the present embodiment the lost motion mechanism, associated with the motion transmitting member and fully described in connection with the embodiment shown in Fig. 1 which involves the use of a booster spring for limiting the minimum pressure between the contacts as the switch moves toward its dead center position, may advantageously be employed. This mechanism is indicated generally at 242 in Fig. 6.

It will be evident that the switch mechanism shown in Fig. 6 may equally well be embodied in the device shown in Fig. 1, and it will further be apparent that many specific changes in the design of the apparatus disclosed herein by way of example may be made without departing from the principles of the invention, and it is further particularly to be noted that certain novel features of the invention embodied in the device as a whole and in certain of the elements thereof may be embodied to the exclusion of others in the above described and also in other kinds of mechanism.

The invention is accordingly to be understood as embracing all apparatus falling within the scope of the appended claims.

What is claimed:

1. In a time delay control apparatus, a motion transmitting member, means providing a spring load for moving said member and means for controlling the rate of movement of said member under the influence of said spring comprising means including a flexible perforated diaphragm attached to said member providing an air chamber, means providing a leak port of adjustable area for venting said chamber, and check valve means for admitting air to said chamber through the perforations in said diaphragm and for preventing passage of air from the chamber through said perforations.

2. In a time delay control apparatus, a motion transmitting member, means for reciprocating said member including a spring for moving the member in one direction, and means for controlling the rate of movement of the member in said one direction comprising a flexible diaphragm attached to said member and to a fixed wall structure to form therewith a diaphragm chamber, said diaphragm being perforated and having a check valve associated therewith arranged to admit air to said chamber through the perforations in the diaphragm and to prevent flow of air from the chamber through said perforations, means providing an adjustable vent port of variable area in said fixed wall structure for venting said chamber, and a filter secured to said wall structure between said diaphragm and said port for filtering air discharged from the chamber through the port.

3. A structure as set forth in claim 1 in which said diaphragm is centrally secured to said member and in which said check valve is formed by an imperforate valve element on one side of the diaphragm and a spring loaded valve element on the other side operative to clamp the diaphragm between said elements to prevent flow of air through the perforations of the diaphragm when the air in the diaphragm chamber is compressed by movement of said member.

4. A structure as set forth in claim 1 in which a plurality of perforations are provided in the central portion of said diaphragm and said check valve means comprises cooperating clamping members carried by said motion transmitting member on opposite sides of the diaphragm for yieldably clamping between them an annulus of said diaphragm adjacent to and radially outside of said perforations.

5. A structure as set forth in claim 1 in which a plurality of perforations are provided in the central portion of said diaphragm and said check valve means comprises cooperating clamping members carried by said motion transmitting member on opposite sides of the diaphragm for yieldably clamping between them an annulus of said diaphragm adjacent to and radially outside of said perforations, the one of said clamping members within said chamber comprising an annular ring, and a centrally located spring secured to said motion transmitting member and having radially extending arms engaging said ring to press it against the diaphragm and restrain it against lateral movement relative to the diaphragm.

6. In a time delay device, a motion transmitting member movable from a first terminal position to a second terminal position, timing mechanism for controlling the rate of movement of said member in the direction from said first position to said second position, and spring means for moving said member in said direction and exerting a force thereon in said second position at least as great as the force exerted in said first position.

7. A device as set forth in claim 6 including spring means exerting a greater force on said member in said second position than in said first position.

8. A device as set forth in claim 6 including spring means exerting progressively greater force on said member as it moves from said first position toward said second position.

9. In a time delay device, means providing a variable volume diaphragm chamber, a motion transmitting member operatively connected to and movable with the diaphragm of said chamber, throttling means for controlling fluid flow to govern the rate at which said diaphragm is movable in one direction, and spring means biasing said motion transmitting member and diaphragm to move in said one direction and exerting at least a non-diminishing force thereon during the movement of the parts in said direction.

10. In a time delay device, a casing structure providing a timing chamber formed in part by a diaphragm carried by said casing structure, means for substantially freely admitting fluid to said chamber upon movement of said diaphragm in one direction operative to enlarge said chamber, means for restricting flow of fluid from said chamber upon movement of said diaphragm in the opposite direction to decrease the volume of said chamber, and a spring for moving said diaphragm in said opposite direction, said spring comprising a rim portion supported at peripherally spaced intervals by said casing structure and finger portions extending inwardly from said rim portion to transmit force to said diaphragm.

11. A device as set forth in claim 10 in which the rim portion of the spring is supported to permit freedom of flexure of the segments of the spring between the supports.

12. A device as set forth in claim 10 in which means are provided for limiting movement of said diaphragm between two terminal positions, and in which abutment surfaces engaged by the inner ends of said fingers are located to maintain said fingers bowed in both of said terminal positions and all intermediate positions therebetween.

13. A device as set forth in claim 10 in which means are provided for limiting the movement of the diaphragm between two terminal positions and in which the inner ends of the spring fingers engage abutment surfaces maintaining the fingers bowed in both terminal positions and all intermediate positions therebetween, and the inner ends of said fingers being located on one and the same side of the plane of the rim portion of the spring in both of said terminal positions.

14. In a time delay control device, a motion transmitting member, means for reciprocating said member including a spring for moving the member in one direction, means providing a vented timing chamber for controlling the rate of movement of said member in said one direction, means for moving said member in the opposite direction against the force exerted by said spring and an over center switch actuated by said member, said switch including a spring element flexed by movement of the switch to either of its two terminal positions, said spring element tending to return the spring to its center position to thereby decrease the force required to be applied by said motion transmitting member to throw the switch from one to the other of its terminal positions.

15. A device as set forth in claim 14 in which said switch comprises a movable contact member secured at one end and mounted for movement of its free end between spaced contact points, a spring member fixed at one end for cantilever action, and a U-shaped spring having its ends engaging said members and compressed therebetween for holding said contact member in either one or the other of its terminal positions, said spring member and said contact member being mounted relative to each other so that in each of said terminal positions said spring member is flexed to exert a spring load on said U-shaped spring tending to move the switch to the other terminal position.

16. An over center switch comprising a movable contact member secured at one end, means providing spaced contacts between which the free end of said member is movable, said contacts determining the terminal positions of said member, a separate spring member rigidly fixed at one end for cantilever movement, and a U-shaped spring at its one end engaging the free end of said spring member and at its other end engaging said contact member at a place spaced from the secured end of the latter, said U-shaped spring being compressed to force the contact member to one or the other of its terminal positions and said spring member being mounted relative to said contact member so that it is flexed in either one of the terminal positions to exert a force tending to move the switch to the other terminal position.

17. A switch as set forth in claim 16 in which said contact member comprises a pair of spaced flexible arms each fixed at one end so that the contact end of the member is movable to its terminal positions due to flexure of said arms.

18. A switch as set forth in claim 16 in which said contact member comprises a pair of spaced arms each secured at one end and in which the free end of said spring member projects between the secured end portions of said arms.

19. A switch as set forth in claim 16 in which the switch is moved from a terminal position toward dead center position by force applied to the flexed spring member.

20. In a spring actuated mechanism, two relatively movable elements and a spring for moving said elements relative to each other in a given direction, said spring comprising a rim portion disposed transversely of said given direction and supported at peripherally spaced places by one of said elements and a plurality of finger portions extending inwardly from said rim portion and supported at their inner ends by the other of said elements, the distance of the places of support for said inner ends from said rim, within the normal range of relative movement between said elements, being less than the length of said fingers whereby to cause said fingers to be bowed with respect to a plane normal to said given direction of movement.

21. In a spring actuated mechanism, two relatively movable elements and a spring for moving said elements relative to each other in a given direction, said spring comprising a narrow annular rim portion disposed transversely of said given direction and freely supported at peripherally widely spaced places by abutments on one of said elements to permit freedom of flexure of the rim portion with respect to a plane normal to said given direction and a plurality of relatively long and narrow and peripherally widely spaced finger portions extending inwardly from said rim portion, said finger portions being supported at their inner ends by the other of said elements and the distance of the places of support for said inner ends from said rim, within the normal range of relative movement between said elements, being less than the length of said fingers whereby to cause said fingers to be bowed with respect to a plane normal to said given direction of movement.

22. Mechanism as defined in claim 21, in which said spring comprises elastic sheet material of uniform thickness, the spring being flat when the material is unstressed.

23. Mechanism as defined in claim 21, in which said spring comprises elastic sheet material providing a rim portion of different thickness than the finger portions, the spring being flat when the material is unstressed.

24. Mechanism as defined in claim 21, in which said spring comprises elastic sheet material and in which the rim portion is thicker than the finger portions, the spring being flat when the material is unstressed.

CARL LINDAHL.

REFERENCES CITED

The following references are of record in the file of this patent:

UNITED STATES PATENTS

| Number | Name | Date |
|---|---|---|
| 796,646 | Hewlett | Aug. 8, 1905 |
| 824,318 | Thorp | June 26, 1906 |
| 959,073 | Richardson | May 24, 1910 |
| 1,364,980 | Burnham | Jan. 11, 1921 |
| 1,464,478 | Greenwood | Aug. 7, 1923 |
| 1,838,020 | Hammerly | Dec. 22, 1931 |
| 1,872,303 | Krantz | Aug. 16, 1932 |
| 1,875,616 | Kohout | Sept. 6, 1932 |
| 1,977,333 | Wunche | Oct. 16, 1934 |
| 1,995,721 | Sanford | Mar. 26, 1935 |
| 2,029,136 | Stevens | Jan. 28, 1936 |
| 2,032,189 | Stilling | Feb. 25, 1936 |
| 2,103,378 | Oestnaes | Dec. 28, 1937 |
| 2,145,813 | Kannegeiter | Jan. 31, 1939 |
| 2,158,346 | Wilhelm | May 16, 1939 |
| 2,169,787 | Becker | Aug. 15, 1939 |
| 2,206,212 | Wainwright | July 2, 1940 |
| 2,228,523 | Johnson | Jan. 14, 1941 |
| 2,237,705 | Kohl | Apr. 8, 1941 |
| 2,291,019 | Biermann et al. | July 28, 1942 |
| 2,325,193 | Nutt et al. | July 27, 1943 |
| 2,330,506 | Matthias | Sept. 28, 1943 |
| 2,360,786 | Miquelon | Oct. 16, 1944 |
| 2,360,856 | Doughman | Oct. 24, 1944 |
| 2,377,461 | Swift | June 5, 1945 |
| 2,377,596 | Williams | June 5, 1945 |
| 2,387,089 | Peterson et al. | Oct. 16, 1945 |
| 2,394,747 | Campbell | Feb. 12, 1946 |
| 2,416,570 | Coleman | Feb. 25, 1947 |
| 2,418,068 | Cornelius | Mar. 25, 1947 |
| 2,521,277 | Aubert | Sept. 5, 1950 |